United States Patent
Eustace (10) Patent No.: US 12,110,086 B2
(45) Date of Patent: Oct. 8, 2024

(54) METHODS AND SYSTEMS FOR SURVEYING USING DEEP-WATER VESSELS

(71) Applicant: Aqua Satellite, Inc., Menlo Park, CA (US)

(72) Inventor: Robert Alan Eustace, Menlo Park, CA (US)

(73) Assignee: Aqua Satellite, Inc., Menlo Park, CA (US)

( * ) Notice: Subject to any disclaimer, the term of this patent is extended or adjusted under 35 U.S.C. 154(b) by 318 days.

(21) Appl. No.: 17/508,575

(22) Filed: Oct. 22, 2021

(65) Prior Publication Data

US 2022/0161912 A1 May 26, 2022

Related U.S. Application Data (60) Provisional application No. 63/116,702, filed on Nov. 20, 2020.

(51) Int. Cl.
  *B63G 8/39* (2006.01)
  *B60L 8/00* (2006.01)
  (Continued)

(52) U.S. Cl.
  CPC ............... *B63G 8/39* (2013.01); *B60L 8/003* (2013.01); *B60L 50/60* (2019.02); *B63G 8/001* (2013.01); *B63G 8/04* (2013.01); *B63G 8/08* (2013.01); *B63G 8/14* (2013.01); *B64D 1/02* (2013.01); *G01C 21/3807* (2020.08); *G01C 21/3841* (2020.08); *G01S 7/003* (2013.01);
  (Continued)

(58) Field of Classification Search
  CPC . B63G 8/39; B63G 8/001; B63G 8/04; B63G 8/08; B63G 8/14; B63G 2008/004; B60L 50/60; B60L 8/003; G01C 21/3841; G01C 21/3807; B64D 1/02; G01S 7/003; G01S 15/89; G05D 1/0875; H02J 7/35
  See application file for complete search history.

(56) References Cited

U.S. PATENT DOCUMENTS

2003/0167998 A1* 9/2003 Huntsman ................ B63G 8/08
                                                                        114/313
2004/0147841 A1* 7/2004 McLaughlin ....... G01S 15/8981
                                                                        600/437

(Continued)

*Primary Examiner* — Behrang Badii
*Assistant Examiner* — Jay Khandpur
(74) *Attorney, Agent, or Firm* — Kilpatrick Townsend & Stockton LLP (57) ABSTRACT

A method for surveying a body of water includes providing a plurality of vehicles to a body of water. Each the plurality of vehicles includes a vehicle body, an electric-propulsion motor system mounted on the vehicle body, a rechargeable battery, at least one sonar device attached to the vehicle body, and a first communication device. The method also includes submerging each of the plurality of vehicles in the body of water, surveying an area, using the at least one sonar device, to map the body of water and to determine a location of each of the plurality of vehicles, and determining, based on the surveying, that a target object is detected within the area. The method also includes resurfacing each of the plurality of vehicles and transferring data, using the first communication device, between at least two of the plurality of vehicles at the surface of the body of water.

17 Claims, 6 Drawing Sheets

(51) Int. Cl.
    *B60L 50/60*          (2019.01)
    *B63G 8/00*           (2006.01)
    *B63G 8/04*           (2006.01)
    *B63G 8/08*           (2006.01)
    *B63G 8/14*           (2006.01)
    *B64D 1/02*           (2006.01)
    *G01C 21/00*         (2006.01)
    *G01S 7/00*           (2006.01)
    *G01S 15/89*         (2006.01)
    *G05D 1/00*          (2024.01)
    *H02J 7/35*           (2006.01)

(52) U.S. Cl.
    CPC ............ *G01S 15/89* (2013.01); *G05D 1/0875* (2013.01); *H02J 7/35* (2013.01); *B63G 2008/004* (2013.01)

(56) References Cited

U.S. PATENT DOCUMENTS

| | | | |
|---|---|---|---|
| 2012/0318188 A1* | 12/2012 | Hudson | B63G 8/001 |
| | | | 114/333 |
| 2016/0097875 A1* | 4/2016 | Kowalczyk | G01V 3/165 |
| | | | 701/21 |
| 2017/0137098 A1* | 5/2017 | Valsvik | B63G 8/08 |
| 2018/0224568 A1* | 8/2018 | Brizard | G01V 1/3835 |
| 2019/0353815 A1* | 11/2019 | Postic | B63B 3/26 |
| 2020/0180740 A1* | 6/2020 | Christ | B63B 23/34 |
| 2020/0269759 A1* | 8/2020 | Watanabe | B60R 1/00 |
| 2021/0048544 A1* | 2/2021 | Wolfel | G01V 1/3852 |
| 2023/0344524 A1* | 10/2023 | Bray | H04B 10/66 |

* cited by examiner

METHODS AND SYSTEMS FOR SURVEYING USING DEEP-WATER VESSELS

CROSS-REFERENCE TO RELATED APPLICATION

This application claims priority to and the benefit of U.S. Provisional Patent Application No. 63/116,702, filed Nov. 20, 2020, which is hereby incorporated by reference in its entirety for all intents and purposes.

BACKGROUND OF THE INVENTION

Deep-water surveying requires searchers to invest significant time and money for a single expedition. For example, a typical search for an object of interest (e.g., Amelia Earhart's Lockheed Model 10 Electra) requires special-purpose equipment and an expert crew that can maintain and operate the special-purpose equipment. Conventional deep ocean surveying requires searchers to identify a search area, obtain a very large and expensive ship, hire a crew to operate the ship, schedule time on that ship (e.g., usually months or years in advance), move the ship to an area as close as possible to the search area, install all the special-purpose equipment on the ship to conduct the search, bring spare components on the ship, hire experts to maintain and operate the special-purpose equipment, and monitor the search as it progresses.

Despite the progress made in the area of ocean exploration, methods and systems are needed in relation to deep water exploration.

SUMMARY OF THE INVENTION

The present disclosure relates to methods and systems for deep-water surveying. In particular, the present disclosure provides methods and systems for deep-water surveying that can significantly expand search areas, reduce costs, and provide real-time analysis in an efficient manner.

This disclosure presents a novel approach to provide a cheap and efficient surveying techniques for deep-water exploration. In particular, the disclosure describes a number of embodiments related to methods of surveying a body of water (e.g., an ocean floor) that completely avoids the use of a ship, specialized docking stations for autonomous underwater vehicles (AUVs), and a specialized crew. Due to the time and expense of typical deep-water surveying expeditions, the amount of surveyed ocean is very limited. As such, methods and systems described herein may be used to efficiently and cost-effectively survey in deep-water environments. Although some of the embodiments discussed herein are related to methods and system for surveying in deep-water applications, it is to be understood that the approaches described here may be employed in any suitable body of water.

In some embodiments, the method provides a plurality of vehicles to a surface of a body of water. For example, the plurality of vehicles can be air dropped to the surface of the body of water. This avoids the use of an expensive ship or any expensive equipment (e.g., specialized docking equipment) to deploy vehicles. The vehicles can be submerged in the body of water to survey an area using at least one sonar to map the body of water and to determine a location of each of the plurality of vehicles. Based on the surveying, a target object can be detected within the area. The vehicles can resurface at specific times (e.g., during daytime) or upon a triggering event (e.g., low battery). For example, the vehicles can be resurfaced during daylight hours (e.g., to recharge batteries and to communicate with each other or a global satellite network) and can be deployed into the water during non-daylight hours. When the vehicles resurface, the vehicles can communicate with one or more other vehicles or a global satellite network. Thus, in an embodiment, the vehicles will resurface every morning, and then go back to the bottom every evening. When the expedition is complete, the vehicles can swim to a known location, for example, close to shore for pickup, or swim to the next search area.

According to an embodiment of the present invention, a method for surveying a body of water is provided. The method includes providing a plurality of vehicles to a body of water. Each of the plurality of vehicles includes a vehicle body, an electric-propulsion motor system mounted on the vehicle body, a rechargeable battery configured to provide electrical power to the electric-propulsion motor system, at least one sonar device attached to the vehicle body, and a first communication device. The method also includes submerging each of the plurality of vehicles below a surface of the body of water, surveying an area, using the at least one sonar device, to map the body of water and to determine a location of each of the plurality of vehicles and determining, based on the surveying, that a target object is detected within the area. The method further includes resurfacing each of the plurality of vehicles to the surface and transferring data, using the first communication device, between at least two of the plurality of vehicles at the surface of the body of water.

Numerous benefits are achieved by way of the present disclosure over conventional techniques. For example, embodiments of the present disclosure provide methods and systems that avoid conventional surveying hurdles while improving the search capacity and accuracy of the search in deep-water environments. As explained in the disclosure, the methods and systems do not need to rely on expensive ships, a specialized crew, or special-purpose equipment. These and other embodiments of the disclosure, along with many of their advantages and features, are described in more detail in conjunction with the text below and attached figures.

DETAILED DESCRIPTION OF SPECIFIC EMBODIMENTS

The present disclosure describes a number of embodiments related to methods and systems for surveying in deep-water environments. Such deep-water environments may include regions near the ocean floor, where extremely high pressures are common (e.g., 15,750 pounds per square inch (psi), or about 108,592 kilopascals). In conventional deep-water surveying expeditions (e.g., deep ocean exploration), a large ship is required to transport underwater vehicles (e.g., autonomous underwater vehicles) to a specific location and the ship must be rigged with special-purpose equipment to dock and deploy the underwater vehicles. Along with the ship, a specialized crew and expensive sonar systems are needed to operate and locate the underwater vehicles leading to additional costs and inefficiencies. However, such methods for surveying a body of water require significant time commitment from the crew, a tremendous amount of overhead costs, and inefficiencies. As such, methods and systems that are cheap and efficient for deep-water surveying are disclosed.

Some conventional deep-water surveying methods employ a towed sled including a side scanning sonar system to create an image of large areas of the seafloor. For example, a boat may tow a sled including the side scanning sonar system a number of miles behind the boat. By varying the boat speed, and using a winch on a cable, the depth of the sled above the sea floor can be controlled. The towed sled typically uses a cable so that the sonar operator can monitor the sonar in real time.

Another conventional deep-water surveying method utilizes an Autonomous Underwater Vehicle (AUV) to create an image of large areas of the seafloor. As one example, the Eustace Earhart Discovery Mission lasted 59 days, and surveyed 723 square nautical miles of the ocean floor at a cost of $4,340 ($3,203,000/723) per square nautical mile. The Eustace Earhart Discovery Mission utilized a REMUS 6000 m (produced by Woods Hole Oceanographic Institution) AUV having a side scanning sonar system. During the mission, the sonar system was set at 120 kHz, which provided a sonar range of 600 m on each side of the AUV. The sonar system provided a pixel resolution at the extreme end of the range of about 30 cm. The support crew included five REMUS 6000 AUV operators, two sonar operators, and five additional expedition personnel, including a doctor, logistics, operations, and communications. All personnel needed to leave their homes and jobs, and spend 59 days at sea, in addition to the setup and teardown of the ship. The REMUS 6000 AUV is 12 feet long, weighs 1900 pounds, costs $1.9 M, and requires a very elaborate and expensive system to dock and deploy the AUV. The REMUS 6000 AUV is programmed for each sortie on the ship, launched from ship, and dropped to the bottom of the ocean using lead weights. The AUV used acoustic transponders to locate its position and then swam the search pattern that had been pre-programmed. When the sortie is completed, another set of weights is dropped from the AUV, and the AUV floats to the surface. The AUV is brought back onto the ship and the data is downloaded onto a server. The batteries of the AUV are replaced with recharged batteries, and then the process begins again. Each sortie takes approximately 26 hours from the start of one sortie, to the start of the next, assuming that everything works to perfection.

Additionally, conventional deep-water surveying techniques deploy underwater vehicles by using metal weights (e.g., lead weights) to sink the vehicle to the seafloor. The vehicles release the weights to return the vehicle to the surface. Each time the vehicle resurfaces, the weights have to be replaced by a crew member for the next dive, thereby leading to inefficiencies. The vehicles are also constantly communicating using acoustic modems to provide status updates to the crew on the ship, which expends large amounts of energy. However, such a power drain may significantly reduce the amount of search time or may result in a limited search area. The vehicles are frequently returned to the ship to recharge or change batteries due this power drain. As such, methods and systems for deploying underwater vehicles that are highly efficient are disclosed.

According to embodiments of the present invention, methods and systems are provided that enable cheap, efficient, and less-resource intensive ways of performing deep-water surveying. As discussed above, many current deep-water exploration techniques require expensive ships that are on expeditions for weeks, special-purpose equipment for docking and deploying underwater vehicles, an expert crew to maintain and operate the special-purpose equipment, and energy-draining communication means (e.g., transponders). The methods and systems described herein may be employed in deep-water ocean exploration to address these and other problems. For example, the methods and systems described herein may not require a ship, special-purpose equipment for docking and deploying underwater vehicles, or an expert crew, thus providing a cheap and efficient alternative to survey deep-water environments. In some embodiments, the disclosed systems and methods may eliminate the need for a ship, a specialized crew, and energy-draining communication means, as will become apparent from the disclosure.

In some embodiments, the methods and systems described herein provide very cost-effective and efficient techniques for surveying a body of water that does not require a ship, a specialized crew, or an expensive sonar system. In some embodiments, the present disclosure provides highly-efficient vehicles to the surface of a body of water. The vehicles utilize an efficient electric-propulsion motor system that does not require the use of weights to reach the ocean floor, nor do the vehicles need to carry any weight while navigating the ocean floor. Additionally, the vehicles communicate (e.g., with other vehicles or a ship) at specific times during a search, leading to a more efficient search.

Figure 1:
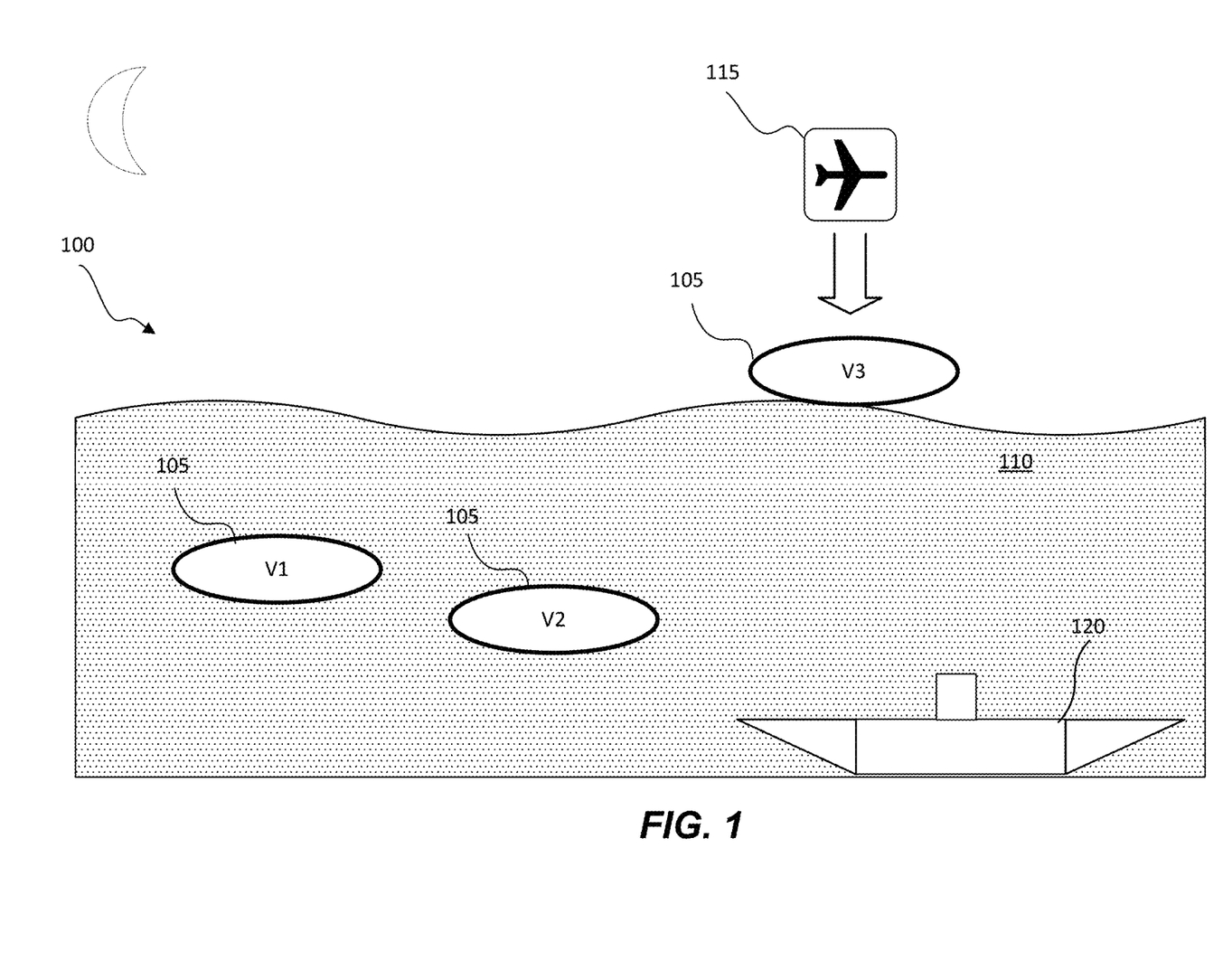
FIG. 1 is a simplified schematic diagram of underwater vehicles deployed on and in a body of water.

FIG. 1 is a simplified schematic diagram of underwater vehicles deployed on and in a body of water according to embodiments of the present disclosure. The system 100 may include a plurality of vehicles 105 that are provided to a body of water 110. In some embodiments, the vehicles are provided to a surface of body of water 110. The vehicles 105 may be provided to the body of water 110 in various ways. In some embodiments, the vehicles 105 can be navigated, shipped (e.g., via a boat or submarine), or air-dropped to a target location in the body of water 110. For example, the vehicles 105 can be circumnavigated from a dock or port to a target location in the body of water 110. In some embodiments, the target location in the body of water 110 may include a target object 120.

In some embodiments, the vehicles 105 can be air dropped from an aerial vehicle 115 such as an airplane by parachute to the body of water 110. In some embodiments, the aerial vehicle 115 may be an airborne platform suitable for carrying and deploying the vehicles, an aircraft, an airplane, a helicopter, or an unmanned aerial vehicle (UAV). For example, the vehicles 105 may be air-dropped by a remotely-controlled UAV. The UAV may carry one or more of the vehicles 105 to a target location and the vehicles 105 can be air-dropped to the target location. In some embodiments, the vehicles 105 can be equipped with a parachute. In this embodiment, the vehicles 105 can be parachuted from an aerial vehicle 115. In some embodiments, a plurality of UAVs may carry one or more of the vehicles 105 to the same location or different locations. In this way, the methods and systems described herein can reduce or eliminate the need for a ship and specialized equipment for docking and deploying underwater vehicles from the ship, which are typically required in conventional deep-water exploration techniques.

In some embodiments, the vehicles 105 can be autonomous underwater vehicles or remotely operated underwater vehicles. In some embodiments, the vehicles 105 can be autonomous underwater vehicles that are capable of being remotely operated. The vehicles 105 can navigate from a surface of the body of water 110 to target depth (e.g., the seafloor). For example, the vehicles 105 can navigate from the surface of the ocean to the ocean floor. In some embodiments, the vehicles 105 may directly plunge or travel in a corkscrew pattern to the ocean floor. The vehicles 105 may autonomously survey a target location to detect a target object 120. As discussed above, once deployed, the vehicles 105 may navigate the floor of a body of water (e.g., an ocean) to survey the floor to detect the target object 120. In some embodiments, each of the vehicles 105 (V1, V2, and V3) can be assigned to a location and a subset of the vehicles (e.g., V1 and V2) can be deployed to a specific water depth. While surveying, the vehicles 105 may employ a plurality of sonar devices mounted inside or on the exterior of the vehicle 105 to receive sonar data corresponding to the target location. The sonar data may be continuously or intermittently collected. The sonar data is processed to determine whether or not the signals likely correspond to the target object 120.

Traditional systems require the use of acoustic transponders and ships that constantly communicate with the underwater vehicles to determine the location of the vessel. For example. acoustic transponders, which are large devices that require acoustic paths, are dropped to the ocean floor and ships move around with a global-position system (GPS) and rangefinder to find the transponder to find the vehicles. The vehicles are dropped as close to transponder as possible. However, the methods and systems described herein, the vehicles 105 swim to the bottom (e.g., may be a direct plunge or corkscrew), and is not dependent on the location of an acoustic transponder. In some embodiments, the vehicles 105 utilize surface global positioning systems, inertial measurement units, and sonar to locate the vehicle position, and map the floor of the body of water.

In some embodiments, the vehicles 105 may be programmed to recognize profiles associated with certain types of target objects. For example, the profiles of the target objects 120 can represent boats, ships, or man-made structures. During surveying, the vehicles 105 are each submerged below the surface of the body of water 110, and optionally below an expected maximum screw or draft depth of deep-draft vessels that may traverse the body of water. In some embodiments, the vehicle 105 is submerged without any removable weights. For example, the vehicle 105 may not include removable weights to submerge the vehicle 105 to a target depth. The vehicle 105 determines, based on its processing of the received sonar signals, if a target object 120 has been detected. In some embodiments, the vehicle 105 may transmit its sonar information to other vehicles once the vehicles are resurfaced. For example, the vehicles may only communicate with each other once they have resurfaced. In some embodiments, the vehicle 105 may transmit a signal to nearby vehicles, or vehicles located at the surface of the body of water, to deploy other vehicles to the location of the target object 120. For example, if the vehicle determines, based on its processing of the received sonar signals, that a target object 120 has been detected, the vehicle 105 may transmit a signal to nearby vehicles, or vehicles located at the surface of the body of water, to deploy other vehicles to the location of the target object 120. Alternatively, if the vehicle 105 detects an object or structure that is the target object 120, the vehicle 105 can alter its path in real time, for example, to circle the target object 120, collecting additional data that can be used to determine if the object or structure is an actual target or a false positive. Additionally, the vehicle 105 can deploy other sensors that may have a more limited range, but enhanced or different sensor capabilities in order to validate that the target object 120 has been detected. Examples of other sensors include metal detectors, cameras, magnetometers, and the like.

In some embodiments, the vehicles 105 may be deployed simultaneously or may be deployed at different times, for example concurrently or sequentially. For example, a first vehicle may be deployed to survey a target location in the body water. When the first vehicle resurfaces, the first vehicle can transfer its sonar data to one or more other vehicles 105. The one or more vehicles 105 can use this sonar information to build a map and determine a location to survey. In some embodiments, each of the vehicles 105 may be deployed simultaneously during nighttime. Each of the vehicles 105 may survey an area during nighttime whereby the vehicles 105 navigate from the surface of the ocean to the ocean floor to autonomously survey a target location to detect the target object 120. The vehicles 105 can resurface upon a triggering event. For example, the triggering event can be a set period of time (e.g., 8 hours), a battery power threshold, or detection of the target object 120. In some embodiments, the vehicles 105 resurface during daytime to recharge batteries and optionally transfer information to one or more other vehicles 105 or a global satellite network.

Figure 2:
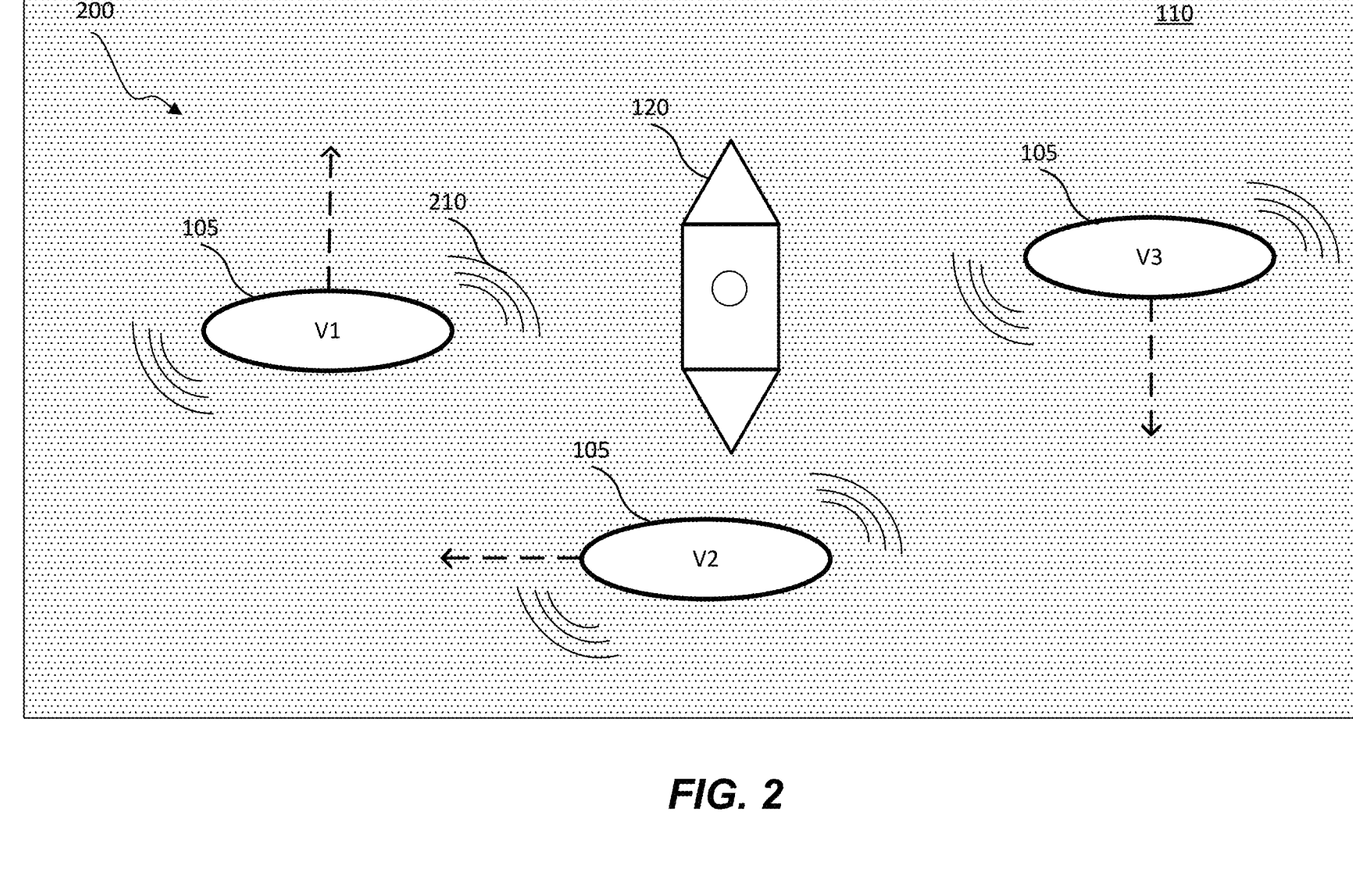
FIG. 2 illustrates a simplified plan view schematic of underwater vehicles surveying a target area of a body of water to detect an object of interest.

FIG. 2 illustrates a simplified plan view schematic of underwater vehicles surveying a target location in a body of water 200 to detect an object of interest. Each of the vehicles 105 comprise at least one sonar device mounted inside or on the vehicle 105 to detect target objects 120 within an area of interest. For example, the vehicles 105 may comprise a single beam, a multibeam, a sidescan, an interferometric sidescan, an acoustic Fresnel lens, a 3D multibeam, or a focused narrow beam. The single beam sonar array is a spherical wave depth sounder and may only produce accurate results for flat, planar surfaces. The multibeam, sidescan, acoustic Fresnel lens sonars are swath imaging systems that scan a thin, wide fan from the vehicle 105 and the vehicle is translated to produce a valid image. In some embodiments, the vehicles 105 may utilize a downward-looking swath-type sonar systems (e.g., multibeam, sidescan, or acoustic Fresnel lens) and a single forward-looking wide beam sonar pinger for obstacle detection. The multibeam imagers can simultaneously image a large number of points within a nominal field-of-view (FOV) and can be discretely arrayed around a vehicle to obtain real-time geometry. Additionally, the focused and stabilized narrow beam sonar provides a characteristic that is uniquely-suited to obtaining true geometry in a complex environment.

In some embodiments, the vehicles 105 include at least one sonar device (e.g., a side scan sonar) mounted on the vehicle body. In some embodiments, the sonar device is mounted on a plurality of locations on the vehicle body. The sonar device may include a plurality of transducer elements spaced apart at one or more distances and configured to receive respective sonar signals for conversion into the sonar data. In some embodiments, multiple vehicles 105 using high-frequency sonar (e.g., greater than 1 MHz) may be deployed, which may reduce the range of the sonar, but provides much better resolution than low frequency sonar (e.g., less than 1 MHz). As shown in the top view illustrated in FIG. 2, the vehicles 105 may independently use sonar 210 to detect the target object 120. The vehicles 105 may implement a simultaneous localization and mapping (SLAM) process that builds a map of the vehicle's environment from sensor data while simultaneously or concurrently using that map to localize the vehicle 105. More specifically, the process can utilize a data driven representation of the vehicle's environment in which the vehicle control circuitry uses a probabilistic algorithm to track a best estimate of the vehicle trajectory (pose) and a 3D map of the environment. In some embodiments, the localization and mapping can be processed independently at separate times. In some embodiments, the vehicles 105 can work together to determine the location of another vehicle. For example, vehicles on a surface of the body of water can use GPS, and vehicles underwater can use acoustic systems to determine the position of a vehicle underwater.

Figure 3:
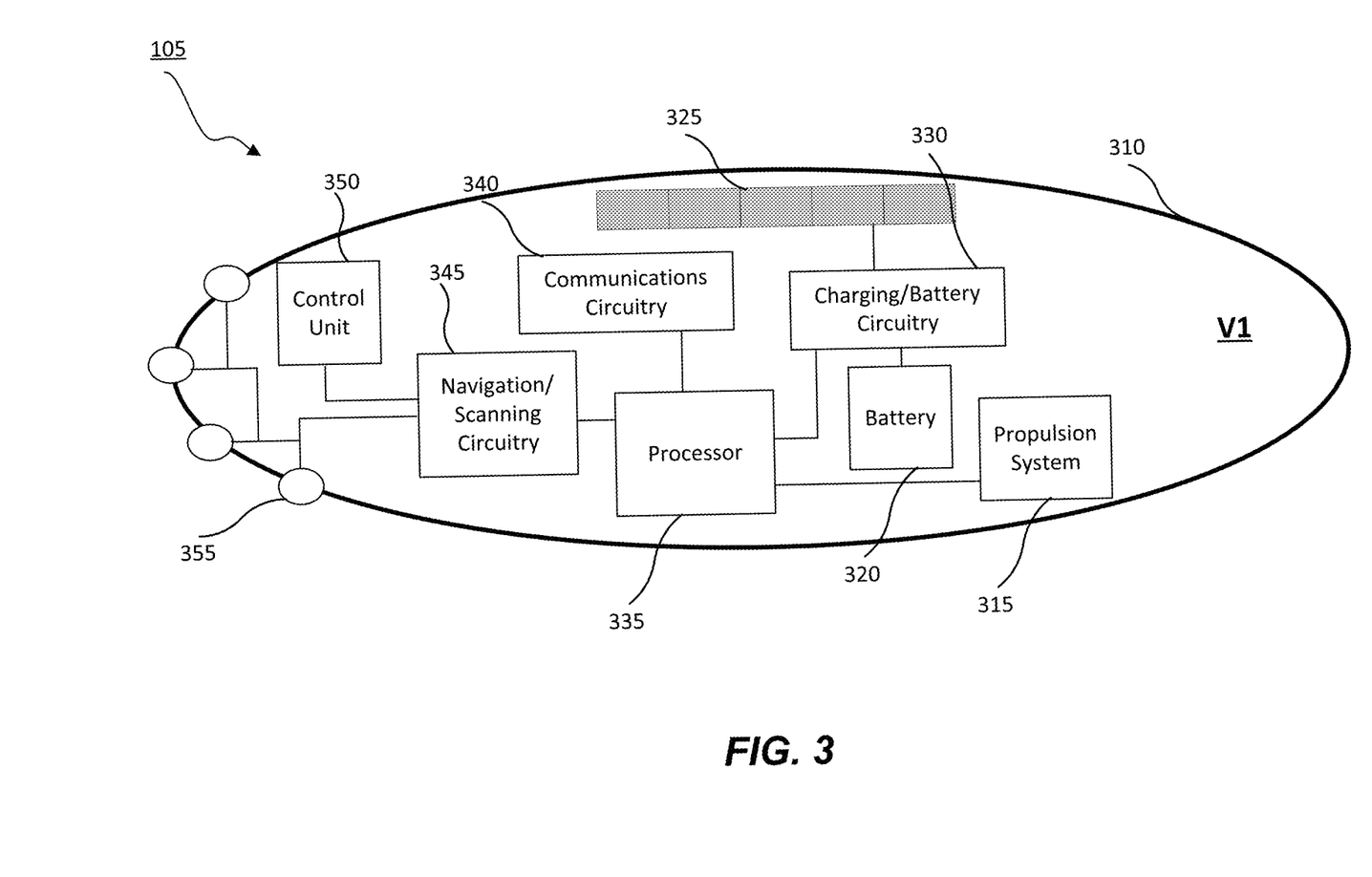
FIG. 3 illustrates an internal cross-sectional view of an underwater vehicle.

FIG. 3 illustrates an internal cross-sectional view of a vehicle 105 according to some embodiments of the present disclosure. As shown in FIG. 3, the structure of the vehicle 105 includes a vehicle body 310. In some embodiments, the vehicle body 310 comprises a uniformly convex shape to reduce possible catch points on the vehicle. For example, the vehicle body 310 may comprise a sphere, an oblate spheroid, an ellipsoid, a flattened ellipsoid, a cylinder with rounded edges, or a domed cylinder. From a hydrodynamic standpoint, the vehicle body 310 may be a flattened ellipsoid characterized by reduced hydrodynamic drag, therefore providing a vehicle with greater range and/or greater sustainable velocity for a given onboard power supply. In some embodiments, the vehicle body 310 may comprise a pressurized hull having a plurality of segments to enable module partition and mounting of equipment.

In some embodiments, the vehicle body 310 comprises a propulsion system 315. The propulsion system may be an electric-propulsion motor system. In some embodiments, an electric-propulsion motor system may include thrusters disposed on the exterior of the vehicle body 310 and, optionally, fixed stabilizing fins for propulsion and direction control. The electric-propulsion motor system may receive power from the rechargeable battery 320. In some embodiments, the electric-propulsion motor system comprises one or more electric motor thrusters. The thrusters may be mounted on the vehicle body 310 at different angles to adjust the output of each propulsion device to control a pitch, a roll, and/or a yaw of the vehicle 105. In some embodiments, the thrusters may adjusted by the processor 335 to control the pitch, roll, and yaw of the vehicle 105. For example, the processor 335 may be in communication with an inertial measurement unit, which works by detecting the current rate of acceleration and changes in rotational attributes, including pitch, roll and yaw. This data is then provided to the processor 335, which can use the data to calculate the current position of the vehicle among other items of interest.

The rechargeable battery 320 may be the main power source for driving the propulsion system 315 (e.g., an electric-propulsion motor system) and communications devices 340. The rechargeable battery 320 may be recharged using solar energy. In some embodiments, one or more solar panels 325 are operable to recharge the rechargeable battery 320. For example, solar panels 325 may be mounted on the exterior of the vehicle body 310 to recharge the rechargeable battery 320. In some embodiments, solar panels 325 can be deployed from inside the vehicle body 310 and retracted after the rechargeable battery 320 has recharged. For example, after the vehicle 105 resurfaces, solar panels 325 may be deployed from inside the vehicle body 310 to charge the rechargeable battery 320. After charging, the solar panels 325 can be retracted back within the vehicle body 310. In some embodiments, a portion of the vehicle body 310 may be transparent to expose the solar panels 325 through the vehicle body 310, thus preventing the solar panels 325 from catching on objects. Charging/battery circuitry 330 may be provided to store solar power derived from the solar panels 325 and to convert the solar energy into electrical energy for the rechargeable battery 320. In some embodiments, a high voltage converter may be provided to convert the voltage and current level utilized in the distribution to the electric-propulsion motor system. In some embodiments, the use time of the vehicle 105 is limited by the capacity of the rechargeable battery 320. In some embodiments, the rechargeable battery 320 is a high-efficiency rechargeable battery designed to supply power for about 10 to 15 hours in one dive.

In some embodiments, the vehicle 105 is provided with a control unit 350 for controlling the navigation in the water during operation. In some embodiments, the vehicle 105 is operated by a pre-programmed method of navigating a predetermined route according to a pre-inputted program using navigation and scanning circuitry 345. In some embodiments, the control unit 350 of the vehicle 105 has a depth sensor for measuring depth from the sea level and an altitude measuring sonometer for measuring altitude from the sea bottom. The control unit 350 maintains depth and altitude within an error range to maintain the course. Thus, in some embodiments, the vehicle 105 has all the information related to the operation and control of the vehicle 105, such as the depth and speed, posture, and the output of the electric-propulsion motor system 315, and the processor 335. This information is processed and stored in an on-board memory of the vehicle 105. In some embodiments, the control unit 350 is configured to control the roll, pitch, and/or yaw of the vehicle 105. For example, based on information from the processor 335, the control unit 350 can adjust the propulsion system 315 to maintain or adjust the roll, pitch, and/or yaw of the vehicle 105. The control unit 350 may adjust the roll, pitch, and/or yaw of the vehicle 105 such that sound waves produced from the sonar device 355 are oriented towards a floor of the body of water.

In some embodiments, the vehicle 105 employs a sonar device 355 to survey a target area. In some embodiments, the sonar device 355 is a side scan sonar array. The side scan sonar can emit an acoustic signal or pulse of sound into the water. If an object is in the path of the sound pulse, the sound bounces off the object and returns an echo to the sonar transducer. The transducer can measure the strength of the signal. By determining the time between the emission of the sound pulse and its reception, the transducer can determine the range and orientation of the object. This information can be processed using the processor 335 and stored in a system memory. In some embodiments, the vehicles include obstacle avoidance sonars that are installed in a plurality of different positions on the vehicle body, and when a sudden change of terrain or an obstacle appears during navigation, the vehicle 105 can navigate to avoid obstacles and continue back on the predetermined route.

In some embodiments, a memory is provided. The memory includes a plurality of program instructions that are executed by the processor 335. When program instructions from the memory are executed by the processor, this causes the processor 335 to obtain the sonar data from the at least one sonar device disposed on the vehicle 105. The processor 335 generates point data based on the received sonar data and generates a map based on the point data. In some embodiments, the map may include a depth line representing an underwater floor of the body of water. The processor is configured to generate a virtual model, in real time, based on the generated map. In some embodiments, the processor is configured to generate a three dimensional virtual model of the target object in real time from the virtual model and the map data. In some embodiments, this data can be transferred to other vehicles 105 when the vehicles are resurfaced.

Although separate processors and control units are illustrated in FIG. 3, it will evident to one of skill in the art that the processor 335, the communications devices 340, the navigation and scanning circuitry 345, and the control unit 350 can be implemented as a single processor or multiple processors. One of ordinary skill in the art would recognize many variations, modifications, and alternatives.

Figure 4:
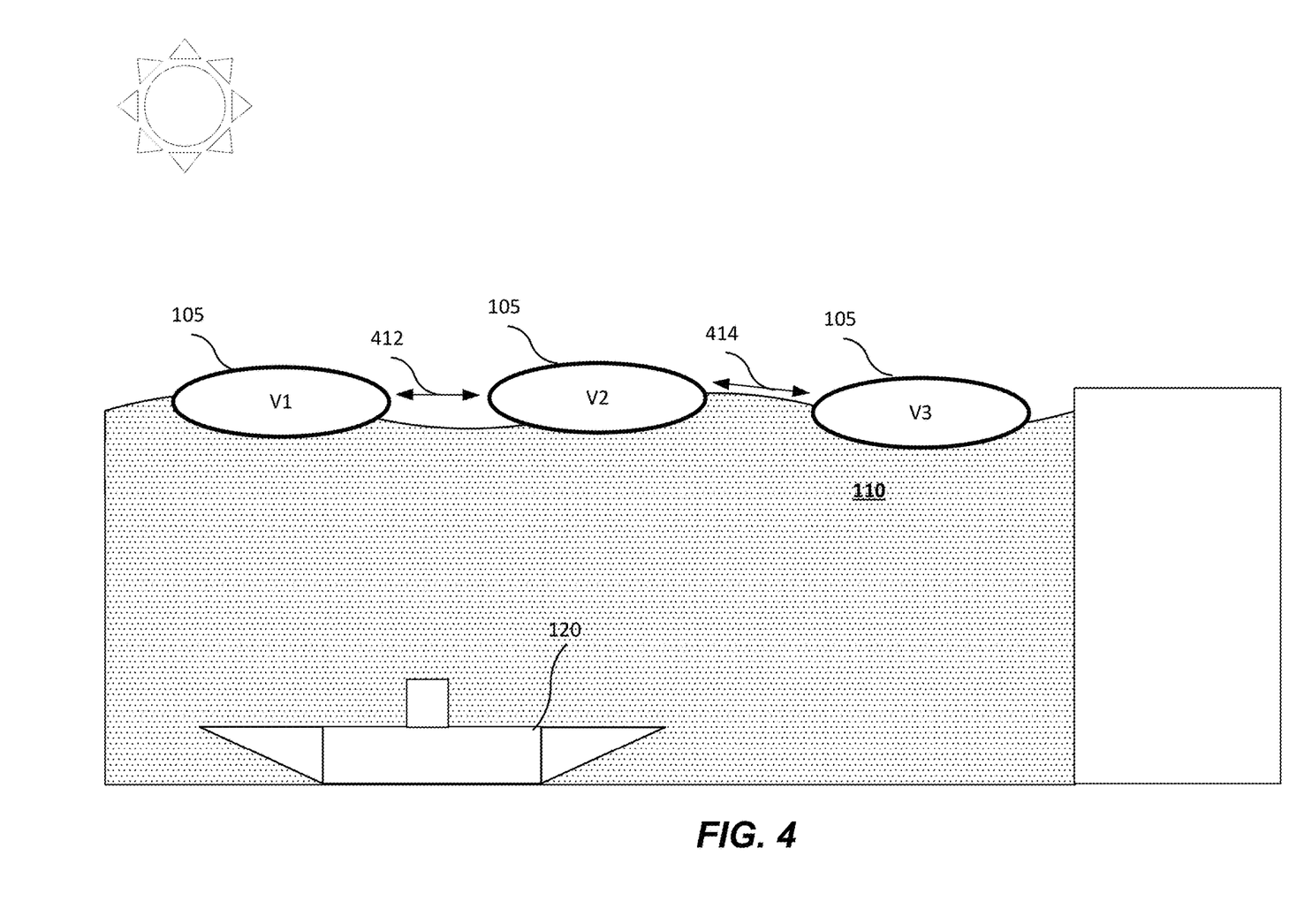
FIG. 4 illustrates a simplified schematic of underwater vehicles communicating with each other at the surface of a body of water.

FIG. 4 illustrates a simplified schematic of vehicles 105 communicating at the surface of a body of water. In some embodiments, the vehicles 105 may comprise one or more communication devices. For example, the vehicles 105 may utilize a high bandwidth wireless communication device to communicate between vehicles on the surface of the ocean. For example, the vehicle 105 may comprise a first communication device comprising a Wi-Fi device. In this way, the vehicles can conserve energy and enable communication while recharging batteries. In some embodiments, the first communication device is configured for communication between each of the plurality of vehicles. For example, the first communication device may enable the vehicles 105 to transfer data between each of the vehicles.

As shown in FIG. 4, the vehicles 105 may enable their communication functions when they resurface. For example, in an embodiment, when the vehicles are submerged, the vehicles do not communicate with each other to conserve energy. As described herein, the vehicles 105 may swim to the surface upon a specific triggering action (e.g., period of time, battery threshold, or detection of an object). When the vehicles 105 are resurfaced, the vehicles can transfer data to one or more other vehicles 105. As an example, data collected by each of the vehicles can be transferred, processed, shared, and the like as illustrated in FIG. 4.

For example, vehicle V1 can transfer and receive data 412 to/from vehicle V2. Likewise, vehicle V3 can transfer and receive data 414 to/from vehicle V2. Thus, data 412 received at vehicle V2 from vehicle V1 can be processed and transferred to vehicle V3 as data 414. Similarly, data 414 received at vehicle V2 from vehicle V3 can be processed and transferred to vehicle V1 as data 412. In some embodiments, data 412 and data 414 can include common data. Based on the exchange of data between vehicles 105 at the surface, the vehicles can determine search areas that have not been surveyed, target objects that have been detected, or mapping information can be combined and transmitted to a satellite network. In some embodiments, the vehicles 105 only communicate on the surface to avoid acoustic communication since acoustic communication is a very inefficient form of communication that typically drains significant amounts of power.

Figure 5:
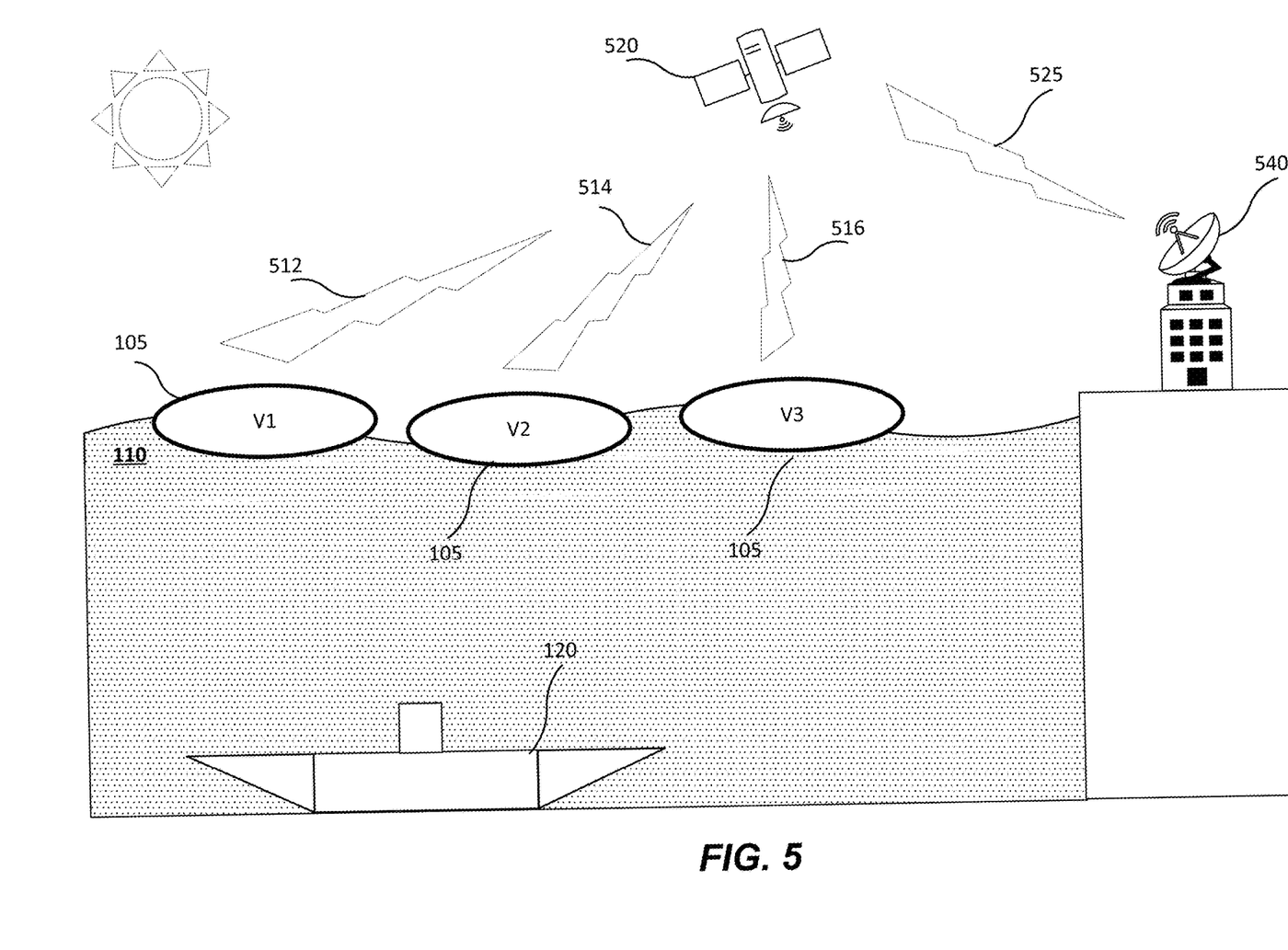
FIG. 5 illustrates a simplified schematic of underwater vehicles communicating with a global satellite network at the surface of a body of water.

FIG. 5 illustrates a simplified schematic of vehicles 105 communicating with global satellite network 520 at the surface of a body of water. As described herein, the vehicles 105 may resurface upon a triggering action. For example, if the vehicle 105 determines that an object of interest is detected on the ocean floor, the vehicle 105 may swim to the surface. The vehicle 105 may transmit a low-band width message 512, 514, 516 over the global satellite network 520 using a second communication device. The low-band width message 512, 514, 516 received by the global satellite network 520 is then sent as a transmission 525 to the satellite network 540. For example, the second communication device may send a data set, including the sonar information of the target object, to a satellite network after the vehicle resurfaces. The second communication device can be a satellite communication device configured to communicate using a secure communications network, for example, the Iridium™ satellite communications systems. In particular, the Iridium™ satellite constellation includes low-earth orbit satellites which, even with a low-earth orbit, provide a communication transmit angle that is almost vertical, meaning that the transmission may not be detected unless the interceptor is very close to or directly above the vehicle. However, the vehicle 105 may be configured to use any of numerous communication systems, networks or protocols for linking to the remote control station, not limited to the Iridium™ system or satellite-based systems. In some embodiments, if no object is detected, the vehicle does not transmit any data over the second communication device to the satellite network 540.

In some embodiments, rather than each vehicle 105 including a second communication device that can be used to communicate with a satellite network, a combination of the communication methods illustrated in FIGS. 4 and 5 can be utilized. As an example, once the vehicle resurface, a local communication network could be used as illustrated in FIG. 4 to consolidate information at one or more of the vehicles. Subsequently, after data processing as needed, for example, to compress the data, the one or more vehicles could communicate the data using the satellite network. In this example, the vehicles using only local communication could conserve power while the one or more vehicles communicating with the satellite network could be assigned search tasks associated with lower power consumption, thereby saving power for satellite communications. Although FIG. 5 only illustrates communications from the vehicles to the satellite network 540, this is not required by the present invention and in other embodiments, data is communicated to the vehicles from the satellite network 540. Accordingly, two way communications are enabled by some embodiments of the present invention.

Figure 6:
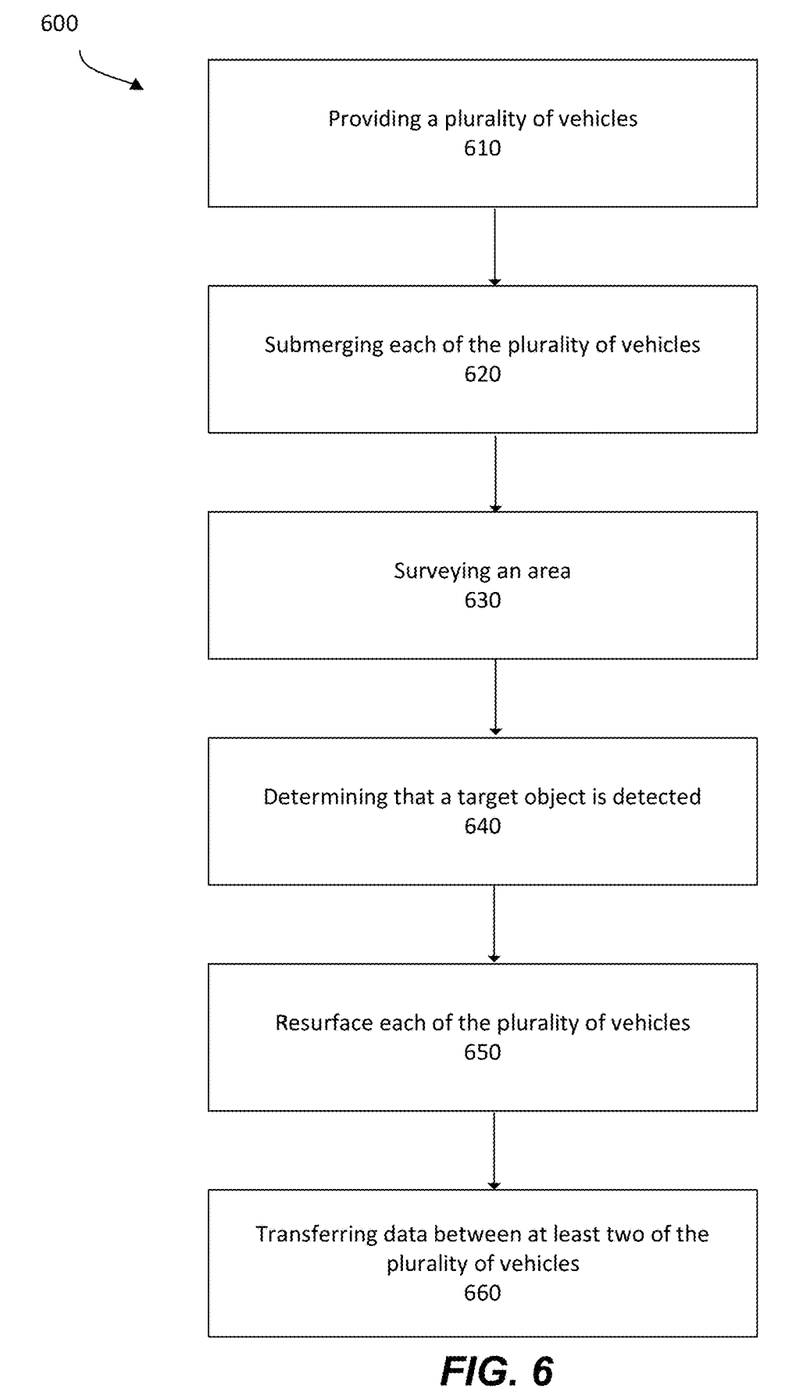
FIG. 6 illustrates a method of surveying using deep-water vessels.

FIG. 6 illustrates an example method 600 for surveying a body of water. The method may include providing a plurality of vehicles to a body of water (610). For example, the vehicles may be air-dropped to the body of water. The vehicles may include a vehicle body, an electric-propulsion motor system mounted on the vehicle body, a rechargeable battery configured to provide electrical power to the electric-propulsion motor system, at least one sonar device attached to the vehicle body, and a first communication device. After the vehicles are provided to the body of water, each of the vehicles may be submerged in the body of water (620). In some embodiments, the vehicles can navigate from the surface of the body of water to the seafloor. For example, vehicles can plunge or corkscrew to the ocean floor. In some embodiments, a first vehicle may be submerged to a first depth and a second vehicle may be submerged to a second depth.

In some embodiments, the method may include surveying an area (630). In some embodiments, one or more side scan sonars are mounted on the vehicles. The vehicles may utilize the sonar device to map the body of water and to determine a location of the vehicle. For example, each the vehicles may independently use sonar to survey a target area. In some embodiments, these mappings can be processed and combined when the vehicles transfer data at the surface of the body of water. The vehicles may implement a simultaneous localization and mapping (SLAM) process that builds a map of the vehicle's environment from sensor data while simultaneously or concurrently using that map to localize the vehicle.

In some embodiments, the method may include determining that a target object is detected within the area (640). Based on the surveying, the processor can process the sonar data to determine if profiles associated with certain types of objects of interest are detected. For example, the profiles of the object of interest can represent boats, ships, or man-made structures. Accordingly, if the vehicle determines, based on its processing of the received sonar signals, that an object of interest has been detected, the vehicle may transmit a signal to nearby vehicles, or vehicles at the surface, to deploy other vehicles to the same location. In some embodiments, vehicle may only communicate with other vehicles at the surface of the body of water.

In some embodiments, the method may include resurfacing each of the plurality of vehicles (650). Each of the vehicles may survey an area during nighttime hours, whereby the vehicles navigate from the surface of the ocean to the ocean floor to autonomously survey a target location to detect objects of interest. The vehicles can be resurfaced upon a triggering event. For example, the triggering event can be a set period of time (e.g., 8 hours), a battery power threshold, or detection of a target object. In some embodiments, the vehicles resurface during daytime hours to recharge batteries and optionally transfer data to one or more other vehicles or a global satellite network. Thus, over an extended period of time, alternating periods of surveying at night and consolidating the survey data and recharging batteries during the day can be used to survey the area in which the vehicles are disposed.

In some embodiments, the method may include transferring data, using the first communication device, between at least two of the plurality of vehicles at the surface of the body of water (660). The first communication device may enable the vehicles to transfer data between each of the vehicles. For example, the vehicles may utilize a high bandwidth wireless communication between vehicles while positioned on the surface of the ocean. In some embodiments, the vehicle may include a first communication device comprising a WiFi device. In this way, the vehicles can conserve energy and enable communication while recharging batteries.

In some embodiments, the method may include transferring a data set, using a second communication device, from one or more of the plurality of vehicles at the surface of the body of water to another vehicle or a remote server. As described herein, the vehicles may swim to the surface upon a specific triggering action (e.g., period of time, battery threshold, or detecting an object). For example, if the vehicle determines that an object of interest is detected on the ocean floor, the vehicle may swim to the surface. The vehicle may transmit a low bandwidth message over the global satellite network to a remote server, for example, a computer associated with the global satellite network, using a second communication device. The second communication device is configured to communicate using a secure communications network, for example, the Iridium™ satellite communications systems. In some embodiments, if no object is detected, the vehicle does not transmit any data over the second communication device to the satellite network.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for manufacturing an enclosure structure with a feedthrough for coupling components housed within the enclosure structure to components external to the enclosure structure, including the particular steps of the method of FIG. 6, this disclosure contemplates any suitable method for manufacturing an enclosure structure with a feedthrough for coupling components housed within the enclosure structure to components external to the enclosure structure, including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6. Finally, although the steps of the method of FIG. 6 are listed as distinct steps, the disclosure contemplates that any of the steps may be performed in combination (e.g., simultaneously and concurrently).

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for surveying a body of water, the method comprising:
    providing a plurality of vehicles to a body of water, each of the plurality of vehicles comprising:
        a vehicle body;
        an electric-propulsion motor system mounted on the vehicle body;
        a rechargeable battery configured to provide electrical power to the electric-propulsion motor system;
        at least one sonar device attached to the vehicle body; and
        a first communication device;
    submerging each of the plurality of vehicles below a surface of the body of water;
    surveying an area, using the at least one sonar device, to map the body of water and to determine a location of each of the plurality of vehicles;
    determining, based on the surveying, that a target object is detected within the area;
    resurfacing each of the plurality of vehicles to the surface;
    transferring sonar data, using the first communication device, between at least two of the plurality of vehicles at the surface of the body of water; and
    processing the sonar data transferred between the at least two of the plurality of vehicles to:
        generate point data based on the sonar data; and
        generate a map based on the point data.

2. The method of claim 1, wherein the first communication device is configured for communication between each of the plurality of vehicles.

3. The method of claim 1, wherein the first communication device comprises a Wi-Fi device.

4. The method of claim 1, wherein one or more of the plurality of vehicles further comprises a second communication device.

5. The method of claim 4, further comprising, after resurfacing each of the plurality of vehicles, sending a data set from the one or more of the plurality of vehicles to a satellite network using the second communication device, wherein the second communication device is a satellite communication device.

6. The method of claim 5, wherein the data set comprises at least some of the data.

7. The method of claim 1, further comprising:
assigning a location to each vehicle of the plurality of vehicles; and
deploying a subset of vehicles at a specific water depth.

8. The method of claim 1, wherein submerging each of the plurality of vehicles further comprises:
submerging a first vehicle to a first depth; and
submerging a second vehicle to a second depth.

9. The method of claim 1, wherein each of the plurality of vehicles comprises:
a processor; and
a memory comprising a plurality of program instructions which, when executed by the processor, cause the processor to:
receive the sonar data from the at least one sonar device disposed on each of the plurality of vehicles, wherein the at least one sonar device includes a plurality of transducer elements spaced apart at one or more distances and configured to receive respective sonar signals for conversion into the sonar data;
generate the point data based on the received sonar data; and
generate the map based on the point data, wherein the map includes a depth line representing an underwater floor of the body of water.

10. The method of claim 9, wherein the processor is configured to generate a virtual model in real time based on the generated map.

11. The method of claim 1, where at least one of the plurality of vehicles is one of an autonomous underwater vehicle or a remotely operated underwater vehicle.

12. The method of claim 1, wherein at least one of the plurality of vehicles comprises an autonomous underwater vehicle.

13. The method of claim 1, further comprising controlling a roll, a pitch, or a yaw of each of the plurality of vehicles such that sound waves produced from the at least one sonar device are oriented towards a floor of the body of water.

14. The method of claim 1, wherein providing the plurality of vehicles to the surface of the body of water comprises air-dropping the plurality of vehicles from an aircraft or an unmanned aerial vehicle.

15. The method of claim 1, wherein submerging each of the plurality of vehicles in the body of water is performed without removable weights.

16. The method of claim 1, further comprising, after resurfacing, charging the rechargeable battery of each of the plurality of vehicles.

17. The method of claim 16, wherein each of the plurality of vehicles comprises one or more solar panels operable to recharge the rechargeable battery.

* * * * *